(12) United States Patent
Piekniewski et al.

(10) Patent No.: US 10,268,919 B1
(45) Date of Patent: Apr. 23, 2019

(54) METHODS AND APPARATUS FOR TRACKING OBJECTS USING SALIENCY

(71) Applicant: Brain Corporation, San Diego, CA (US)

(72) Inventors: Filip Piekniewski, San Diego, CA (US); Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 14/860,579

(22) Filed: Sep. 21, 2015

Related U.S. Application Data

(60) Provisional application No. 62/053,004, filed on Sep. 19, 2014.

(51) Int. Cl.
*G06K 9/00* (2006.01)
*G06K 9/46* (2006.01)
(Continued)

(52) U.S. Cl.
CPC .......... *G06K 9/4671* (2013.01); *B25J 9/1664* (2013.01); *B25J 9/1697* (2013.01); *G01B 11/14* (2013.01);
(Continued)

(58) Field of Classification Search
CPC ...... G06K 9/629; G06K 9/036; G06K 9/3233; G06K 9/4623; G06K 9/4628;
(Continued)

(56) References Cited

U.S. PATENT DOCUMENTS 5,063,603 A 11/1991 Burt
5,138,447 A 8/1992 Shen et al.
(Continued)

FOREIGN PATENT DOCUMENTS

CN 102226740 A 10/2011
JP H0487423 A 3/1992
(Continued)

OTHER PUBLICATIONS

Berkes and Wiskott. Slow feature analysis yields a rich repertoire of complex cell properties. Journal of Vision (2005) vol. 5 (6).
(Continued)

*Primary Examiner* — Avinash Yentrapati
(74) *Attorney, Agent, or Firm* — Reed Smith LLP; Sidharth Kapoor

(57) ABSTRACT

Methods and apparatus for tracking and discerning objects using their saliency. In one embodiment of the present disclosure, the tracking of objects is based on a combination of object saliency and additional sources of signal about object identity. Under certain simplifying assumptions, the present disclosure allows for robust tracking of simple objects with limited processing resources. In one or more variants, efficient implementation of the methods described allow sensors (e.g., cameras) to be used on board a robot (or autonomous vehicle) on a mobile determining platform, such as to capture images to determine the presence and/or identity of salient objects. Such determination of salient objects allow for e.g., adjustments to vehicle or other moving object trajectory.

20 Claims, 10 Drawing Sheets

(51) Int. Cl.
  *G01B 11/14*     (2006.01)
  *G06T 7/20*      (2017.01)
  *G06T 7/40*      (2017.01)
  *G06T 3/00*      (2006.01)
  *B25J 9/16*      (2006.01)

(52) U.S. Cl.
  CPC ..... *G06K 9/00624* (2013.01); *G06K 9/00664* (2013.01); *G06K 9/4642* (2013.01); *G06K 9/4652* (2013.01); *G06T 3/00* (2013.01); *G06T 7/2086* (2013.01); *G06T 7/408* (2013.01); *G06T 2200/04* (2013.01); *G06T 2207/30241* (2013.01); *Y10S 901/09* (2013.01); *Y10S 901/47* (2013.01)

(58) Field of Classification Search
  CPC ...... G06K 9/4652; G06K 9/4671; G06K 9/00; G06K 9/00234; G06K 9/00255; G06K 9/00664; G06K 9/00818; G06K 9/03; G06K 9/3241; G06K 9/623; G06K 9/6256; G06T 2207/10024; G06T 2207/20012; G06T 2207/30168; G06T 2207/30201; G06T 5/003; G06T 7/0002; G06T 1/0014; G06T 2207/10016; G06T 2207/20032; G06T 2207/20044; G06T 2207/20212; G06T 2207/30252; G06T 5/004; G06T 5/008; G06T 5/009; G06T 5/40; G06T 7/11; G06T 7/12; G06T 7/143; G06T 7/162; G06T 7/187; G06T 7/194; G06T 7/44; G06T 9/00; G06T 9/001
  See application file for complete search history.

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,673,367 A | 9/1997 | Buckley | |
| 5,875,108 A | 2/1999 | Hoffberg et al. | |
| 6,009,418 A | 12/1999 | Cooper | |
| 6,014,653 A | 1/2000 | Thaler | |
| 6,035,389 A | 3/2000 | Grochowski et al. | |
| 6,359,601 B1 * | 3/2002 | Maguire, Jr. | G06F 3/013 345/7 |
| 6,418,424 B1 | 7/2002 | Hoffberg et al. | |
| 6,458,157 B1 | 10/2002 | Suaning | |
| 6,501,515 B1 | 12/2002 | Iwamura | |
| 6,501,794 B1 | 12/2002 | Wang et al. | |
| 6,509,854 B1 | 1/2003 | Morita et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,556,610 B1 | 4/2003 | Jiang et al. | |
| 6,581,046 B1 | 6/2003 | Ahissar | |
| 6,625,317 B1 | 9/2003 | Gaffin et al. | |
| 6,678,590 B1 | 1/2004 | Burchfiel | |
| 7,016,783 B2 | 3/2006 | Hac et al. | |
| 7,113,867 B1 | 9/2006 | Stein | |
| 7,142,602 B2 | 11/2006 | Porikli et al. | |
| 7,430,682 B2 | 9/2008 | Carlson et al. | |
| 7,447,337 B2 | 11/2008 | Zhang et al. | |
| 7,580,907 B1 | 8/2009 | Rhodes | |
| 7,653,255 B2 | 1/2010 | Rastogi | |
| 7,737,933 B2 | 6/2010 | Yamano et al. | |
| 7,809,197 B2 * | 10/2010 | Fedorovskaya | G06K 9/00255 358/1.14 |
| 7,849,030 B2 | 12/2010 | Ellingsworth | |
| 8,000,967 B2 | 8/2011 | Taleb | |
| 8,015,130 B2 | 9/2011 | Matsugu et al. | |
| 8,103,602 B2 | 1/2012 | Izhikevich | |
| 8,108,147 B1 | 1/2012 | Blackburn | |
| 8,160,354 B2 | 4/2012 | Paquier | |
| 8,200,593 B2 | 6/2012 | Guillen et al. | |
| 8,311,965 B2 | 11/2012 | Breitwisch et al. | |
| 8,315,305 B2 | 11/2012 | Petre et al. | |
| 8,390,707 B2 | 3/2013 | Yamashita | |
| 8,396,249 B1 * | 3/2013 | Khosla | G06K 9/3241 382/103 |
| 8,396,282 B1 * | 3/2013 | Huber | G06K 9/629 381/56 |
| 8,416,847 B2 | 4/2013 | Roman | |
| 8,416,992 B2 | 4/2013 | Le et al. | |
| 8,467,623 B2 | 6/2013 | Izhikevich et al. | |
| 8,542,875 B2 | 9/2013 | Eswara | |
| 8,712,939 B2 | 4/2014 | Szatmary et al. | |
| 9,070,285 B1 | 6/2015 | Ramu et al. | |
| 9,150,220 B2 | 10/2015 | Clarke et al. | |
| 9,630,318 B2 | 4/2017 | Ibarz et al. | |
| 9,713,982 B2 | 7/2017 | Buibas et al. | |
| 2002/0038294 A1 | 3/2002 | Matsugu | |
| 2002/0176025 A1 | 11/2002 | Kim et al. | |
| 2003/0050903 A1 | 3/2003 | Liaw et al. | |
| 2003/0216919 A1 | 11/2003 | Roushar | |
| 2004/0054964 A1 | 3/2004 | Bozdagi et al. | |
| 2004/0136439 A1 | 7/2004 | Dewberry et al. | |
| 2004/0170330 A1 | 9/2004 | Fogg et al. | |
| 2004/0193670 A1 | 9/2004 | Langan et al. | |
| 2004/0233987 A1 | 11/2004 | Porikli et al. | |
| 2005/0015351 A1 | 1/2005 | Nugent | |
| 2005/0036649 A1 | 2/2005 | Yokono et al. | |
| 2005/0047647 A1 * | 3/2005 | Rutishauser | G06K 9/3233 382/159 |
| 2005/0062846 A1 | 3/2005 | Choi et al. | |
| 2005/0096539 A1 | 5/2005 | Leibig et al. | |
| 2005/0283450 A1 | 12/2005 | Matsugu et al. | |
| 2006/0008144 A1 * | 1/2006 | Prasad | G06K 9/00818 382/173 |
| 2006/0088191 A1 | 4/2006 | Zhang et al. | |
| 2006/0094001 A1 | 5/2006 | Torre et al. | |
| 2006/0127042 A1 | 6/2006 | Park et al. | |
| 2006/0129728 A1 | 6/2006 | Hampel | |
| 2006/0161218 A1 | 7/2006 | Danilov | |
| 2006/0188168 A1 | 8/2006 | Sheraizin et al. | |
| 2006/0285724 A1 | 12/2006 | Tian | |
| 2007/0003130 A1 * | 1/2007 | Goerick | G06K 9/00664 382/153 |
| 2007/0022068 A1 | 1/2007 | Linsker | |
| 2007/0071100 A1 | 3/2007 | Shi et al. | |
| 2007/0109409 A1 | 5/2007 | Yea et al. | |
| 2007/0176643 A1 | 8/2007 | Nugent | |
| 2007/0208678 A1 | 9/2007 | Matsugu | |
| 2008/0043848 A1 | 2/2008 | Kuhn | |
| 2008/0100482 A1 | 5/2008 | Lazar | |
| 2008/0152236 A1 | 6/2008 | Vendrig et al. | |
| 2008/0174700 A1 | 7/2008 | Takaba | |
| 2008/0199072 A1 | 8/2008 | Kondo et al. | |
| 2008/0205764 A1 | 8/2008 | Iwai et al. | |
| 2008/0237446 A1 | 10/2008 | Oshikubo et al. | |
| 2008/0252723 A1 | 10/2008 | Park | |
| 2008/0267458 A1 | 10/2008 | Laganiere et al. | |
| 2009/0018696 A1 * | 1/2009 | Goerick | B25J 9/161 700/245 |
| 2009/0028384 A1 | 1/2009 | Bovyrin et al. | |
| 2009/0043722 A1 | 2/2009 | Nugent | |
| 2009/0096863 A1 | 4/2009 | Kim et al. | |
| 2009/0096927 A1 | 4/2009 | Camp, Jr. et al. | |
| 2009/0106030 A1 | 4/2009 | Den et al. | |
| 2009/0141938 A1 | 6/2009 | Lim et al. | |
| 2009/0195640 A1 | 8/2009 | Kim et al. | |
| 2009/0202114 A1 | 8/2009 | Morin et al. | |
| 2009/0287624 A1 | 11/2009 | Rouat et al. | |
| 2009/0304231 A1 | 12/2009 | Lu et al. | |
| 2009/0312985 A1 | 12/2009 | Eliazar | |
| 2009/0323809 A1 | 12/2009 | Raveendran | |
| 2010/0036457 A1 | 2/2010 | Sarpeshkar et al. | |
| 2010/0073371 A1 | 3/2010 | Ernst et al. | |
| 2010/0080297 A1 | 4/2010 | Wang et al. | |
| 2010/0081958 A1 | 4/2010 | She | |

(56) References Cited

U.S. PATENT DOCUMENTS

| | | |
|---|---|---|
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar et al. |
| 2010/0235310 A1 | 9/2010 | Gage et al. |
| 2010/0271511 A1 | 10/2010 | Ma et al. |
| 2010/0290530 A1 | 11/2010 | Huang et al. |
| 2010/0299296 A1 | 11/2010 | Modha et al. |
| 2011/0002191 A1 | 1/2011 | Demaio et al. |
| 2011/0016071 A1 | 1/2011 | Guillen et al. |
| 2011/0063409 A1 | 3/2011 | Hannuksela |
| 2011/0103480 A1 | 5/2011 | Dane |
| 2011/0119214 A1 | 5/2011 | Breitwisch et al. |
| 2011/0119215 A1 | 5/2011 | Elmegreen et al. |
| 2011/0134242 A1 | 6/2011 | Loubser et al. |
| 2011/0137843 A1 | 6/2011 | Poon et al. |
| 2011/0160741 A1 | 6/2011 | Asano et al. |
| 2011/0164110 A1 | 7/2011 | Fortin et al. |
| 2011/0170792 A1 | 7/2011 | Tourapis et al. |
| 2011/0206122 A1 | 8/2011 | Lu et al. |
| 2011/0222603 A1 | 9/2011 | Le et al. |
| 2011/0228092 A1 | 9/2011 | Park |
| 2011/0242341 A1 | 10/2011 | Agrawal et al. |
| 2011/0280300 A1 | 11/2011 | Tourapis et al. |
| 2012/0011090 A1 | 1/2012 | Tang et al. |
| 2012/0026304 A1 | 2/2012 | Kawahara |
| 2012/0057634 A1 | 3/2012 | Shi et al. |
| 2012/0072189 A1 | 3/2012 | Bullen et al. |
| 2012/0083982 A1 | 4/2012 | Bonefas et al. |
| 2012/0084240 A1 | 4/2012 | Esser et al. |
| 2012/0093402 A1* | 4/2012 | Staelin ............... G06K 9/4671 382/165 |
| 2012/0109866 A1 | 5/2012 | Modha |
| 2012/0130566 A1 | 5/2012 | Anderson et al. |
| 2012/0140032 A1 | 6/2012 | Tabor |
| 2012/0162450 A1 | 6/2012 | Park et al. |
| 2012/0212579 A1 | 8/2012 | Froejdh et al. |
| 2012/0230580 A1 | 9/2012 | Knee |
| 2012/0236114 A1 | 9/2012 | Chang et al. |
| 2012/0243733 A1 | 9/2012 | Sawai |
| 2012/0256941 A1* | 10/2012 | Ballestad ........... G06K 9/00234 345/589 |
| 2012/0294486 A1 | 11/2012 | Diggins et al. |
| 2012/0294546 A1 | 11/2012 | Sakamoto et al. |
| 2012/0300843 A1 | 11/2012 | Horlander et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330447 A1 | 12/2012 | Gerlach et al. |
| 2013/0019024 A1 | 1/2013 | Sheth et al. |
| 2013/0022111 A1 | 1/2013 | Chen et al. |
| 2013/0050574 A1 | 2/2013 | Lu et al. |
| 2013/0051680 A1 | 2/2013 | Kono et al. |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0147915 A1 | 6/2013 | Wiegand et al. |
| 2013/0148882 A1 | 6/2013 | Lee |
| 2013/0151450 A1 | 6/2013 | Ponulak |
| 2013/0176430 A1 | 7/2013 | Zhu et al. |
| 2013/0218821 A1 | 8/2013 | Szatmary et al. |
| 2013/0222534 A1 | 8/2013 | Rusanovskyy et al. |
| 2013/0226532 A1 | 8/2013 | Ben et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325777 A1 | 12/2013 | Petre et al. |
| 2013/0343610 A1 | 12/2013 | Dal et al. |
| 2014/0003711 A1 | 1/2014 | Ngan et al. |
| 2014/0012788 A1 | 1/2014 | Piekniewski |
| 2014/0016858 A1 | 1/2014 | Richert |
| 2014/0028793 A1 | 1/2014 | Wiegand et al. |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0085507 A1* | 3/2014 | Pillman ............... G06T 5/004 348/231.99 |
| 2014/0086486 A1* | 3/2014 | Pillman ............... G06T 5/003 382/173 |
| 2014/0107842 A1* | 4/2014 | Yoon ............... G05D 1/0248 700/259 |
| 2014/0119654 A1 | 5/2014 | Taylor et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0124004 A1 | 5/2014 | Rosenstein et al. |
| 2014/0125773 A1 | 5/2014 | Maki et al. |
| 2014/0156574 A1 | 6/2014 | Piekniewski et al. |
| 2014/0201126 A1 | 7/2014 | Zadeh et al. |
| 2014/0241612 A1 | 8/2014 | Rhemann et al. |
| 2014/0328405 A1 | 11/2014 | Shen et al. |
| 2014/0379179 A1 | 12/2014 | Goossen et al. |
| 2015/0077639 A1 | 3/2015 | Chamaret et al. |
| 2015/0127154 A1 | 5/2015 | Passot et al. |
| 2015/0127155 A1 | 5/2015 | Passot et al. |
| 2015/0181168 A1 | 6/2015 | Pahalawatta et al. |
| 2015/0217449 A1 | 8/2015 | Meier et al. |
| 2015/0269439 A1 | 9/2015 | Versace et al. |
| 2015/0281715 A1 | 10/2015 | Lawrence et al. |
| 2015/0304634 A1 | 10/2015 | Karvounis |
| 2015/0304640 A1 | 10/2015 | Brooks |
| 2015/0312547 A1 | 10/2015 | Cucca |
| 2016/0003946 A1 | 1/2016 | Gilliland et al. |
| 2016/0007043 A1 | 1/2016 | Heo et al. |
| 2016/0009413 A1 | 1/2016 | Lee et al. |
| 2016/0165209 A1 | 6/2016 | Huang et al. |
| 2016/0182884 A1 | 6/2016 | Lin et al. |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

(56) References Cited

OTHER PUBLICATIONS

Dorval et al. 'Probability distributions of the logarithm of interspike intervals yield accurate entropy estimates from small datasets.' Journal of neuroscience methods 173.1 (2008):129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

Floreano et al., 'Neuroevolution: from architectures to learning' Evol. Intel. Jan. 1, 2008:47-62, [retrieved Dec. 30, 2013] retrieved online from URL:http://inforscienee.eptl.cb/record/112676/files/FloreanoDuerrMattiussi2008.pdf<http: />.

Florian03, Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <URL: http://citeseerx.ist.psu.edu/viewdoc/download?doi=10.1.1.216.4931-&rep1&type=pdf>.

Foldiak, P. Learning invariance from transformation sequences. Neural Computation, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. I-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.coinlurl ?sa-t&rct-j&q-Giuck+4)/022STIMULUS+ GENERALIZATION+AND+REPRESENTATIO N+1N +ADAPTIVE+NETWORK+MODELS±0F+CATEGORY+LEARN ING%22+ 1991.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Hopfield JJ (1995) Pattern recognition computation using action potential timing for stimulus representation.Nature 376:33-36.

Izhikevich E. M, and Hoppensteadt F.C. (2009) Polychronous Wavefront Computations. International Journal of Bifurcation and Chaos, 19:1733-1739.

Izhikevich E.M. (2004) Which Model to Use for Cortical Spiking Neurons? IEEE Transactions on Neural Networks, 15:1063-1070.

Izhikevich E.M. (2006) Polychronization: Computation With Spikes. Neural Computation, 18:245-282.

Izhikevich, E,M. (2007) Dynamical Systems in Neuroscience: The Geometry of Excitability and Bursting, The MIT Press, 2007.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. Network, Computation in Neural Systems, 2006, 17 (1), 31-41.

Karbowski et al., 'Multispikes and Synchronization in a Large Neural Network with Temporal Delays', Neural Computation 12. 1573-1606 (2000).

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/ Khotanzad. pdf.

Knoblauch, et at Memory Capacities for Synaptic and Structural Plasticity, Neural Computation 2009, pp. 1-45.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail? id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Masquelier and Thorpe, Learning to recognize objects using waves of spikes and Spike Timing-Dependent Plasticity. Neural Networks (IJCNN), The 2010 International Joint Conference on DOI-10.1109/1JCNN.2010.5596934 (2010) pp. 1-8.

Masquelier, Timothee, 'Relative spike time coding and STOP-based orientation selectivity in the early visual system in natural continuous and saccadic vision: a computational model.' Journal of computational neuroscience 32.3 (2012): 425-441.

Meister, M.; Berry, M.J. The neural code of the retina, Neuron, 1999, 22, 435-450.

Meister, M, Multineuronal codes in retinal signaling. Proceedings of the National Academy of sciences. 1996, 93, 609-614.

Nichols, A Reconfigurable Computing Architecture for Implementing Artificial Neural Networks on FPGA, Master's Thesis, The University of Guelph, 2003, pp. 1-235.

Oster M., Lichtsteiner P,, Delbruck T, Liu S, A Spike-Based Saccadic Recognition System, ISCAS 2007. IEEE International Symposium on Circuits and Systems, 2009, pp. 3083-3086.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu. edu!viewdoc/download?doi=0.1.1.5.4346&rep-repl&type-pdf.

Rekeczky, et al., "Cellular Multiadaptive Analogic Architecture: A Computational Framework for UAV Applications." May 2004.

Revow M., Williams C,, and Hinton, G.E., 1996. Using Generative Models for Handwritten Digit Recognition, IEEE Trans. on Pattern Analysis and Machine Intelligence, 18, No. 6, Jun. 1996.

Sanchez, Efficient Simulation Scheme for Spiking Neural Networks. Doctoral Thesis. (Juiversita di Granada Mar. 28, 2008, pp. 1-104.

Sato et al., 'Pulse interval and width modulation for video transmission.' Cable Television, IEEE Transactions on 4 (1978): 165-173.

Schemmel, J., Grub!, A., Meier, K., Mueller, E.: Implementing synaptic plasticity in a VLSI spiking neural network model. In: Proceedings of the 2006Intemational Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/ download.cgi/4620/ps/1774.pdf> Introduction.

(56) References Cited

OTHER PUBLICATIONS

Schnitzer, M.J.; Meister, M.; Multineuronal Firing Patterns in the Signal from Eye to Brain. Neuron, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from <URL: http://www.mathworks.com/products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL:http://www.ploscompbioI.org/article/info%3Adoi%2F10.1371%2Fjournal,pcbi.1000879<url:></url:>.

Thomas S. and Riesenhuber, M, 2004, Realistic Modeling of Simple and Complex Cell Tuning in the HMAX Model, and Implications for Invariant Object Recognition in Cortex, Al Memo 2004-017 Jul. 2004.

Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

Thorpe, S.J., Delorme, A. & VanRullen, R, (2001). Spike-based strategies for rapid processing. Neural Networks 14, pp. 715-725.

Thorpe, S.J., Guyonneau, R., Guilbaud, N,, Allegraud, J-M, & VanRullen, R. (2004), SpikeNet: real-time visual processing with one spike per neuron. Neurocomputing, 58-60, pp. 857-864.

Van Rullen R,; Thorpe, S, Rate Coding versus temporal order coding: What the Retinal ganglion cells tell the visual cortex. Neural computation, 2001, 13, 1255-1283.

VanRullen, R, & Koch, C. (2003), Is perception discrete or continuous? Trends in Cognitive Sciences 7(5), pp. 207-213.

VanRullen, R., Guyonneau, R. & Thorpe, S.J. (2005). Spike times make sense. Trends in Neurosciences 28(1).

Wallis, G.; Rolls, E. T. A model of invariant object recognition in the visual system, Progress in Neurobiology. 1997, 51, 167-194.

Wang 'The time dimension for scene analysis.' Neural Networks, IEEE Transactions on 16.6 (2005): 1401-1426.

Wiskott, L.; Sejnowski, T.J. Slow feature analysis: Unsupervised learning of invariances, Neural Computation, 2002, 14, (4), 715-770.

Wysoski et al, "Fast and Adaptive Network of Spiking Neuron for Multi-view Visual Pattern Recognition", May 3, 2008, Elsevier,Neurocomputing vol. 71, pp. 2563-2575.

Zarandy et al. "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738<http:login.jsp?tp="&amumber=1438738&url=http%3A%2F%2Fiee"></http:>.

Paugam-Moisy et al., "Computing with spiking neuron networks," G. Rozenberg T. Back, J. Kok (Eds.), Handbook of Natural Computing, Springer-Verlag (2010) [retrieved Dec. 30, 2013], [retrieved online from link.springer.com].

\* cited by examiner

METHODS AND APPARATUS FOR TRACKING OBJECTS USING SALIENCY

CROSS-REFERENCE AND RELATED APPLICATIONS

This application claims the benefit of priority to co-owned U.S. Provisional Patent Application Ser. No. 62/053,004, entitled "SYSTEMS AND METHODS FOR TRACKING OBJECTS USING SALIENCY", filed Sep. 19, 2014, which is incorporated herein by reference in its entirety.

This application is also related to co-owned U.S. Pat. No. 8,977,582, entitled "SPIKING NEURON NETWORK SENSORY PROCESSING APPARATUS AND METHODS", filed on Jul. 12, 2012, and co-pending and co-owned U.S. patent application Ser. No. 13/660,982, entitled "SPIKING NEURON SENSORY PROCESSING APPARATUS AND METHODS FOR SALIENCY DETECTION", filed on Oct. 25, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates to, inter alia, computerized apparatus and methods for detecting features in sensory information.

Description of Related Art

Saliency is a term often used in psychophysics and neuroscience where it may be defined as the ability to attract attention of a particular stimulus. In the visual modality, saliency may be attributed to objects or visual patterns. In primates there are five general aspects of the visual scene which spontaneously attract attention (a phenomenon often called pop-out):
  Color—a unique color surrounded by another color or colors (e.g., a red spot in sea of green) will involuntarily trigger attention.
  Orientation—a bar of one orientation surrounded by bars of another orientation
  Contrast (luminance)—an area characterized by large contrast (a bright thing mixed with very dark things)
  Motion—an object moving in a different direction or speed that surroundings.
  Faces—only for humans and some primates, image resembling a face The biological origin of this behavior is debated. One of the plausible mechanisms is local inhibitory interaction in visual cortex (and perhaps thalamus). Such inhibitory connections arise between neurons which represent things often co-occurring. For example, a segment of vertical line (observed by a spatially restricted receptive field of a neuron) is typically a fragment of a larger line. A color blob seen in a receptive field of a neuron is most often a fragment of a larger blob of the same color. Appearance of a feature (e.g., orientation) which is not expected in a given context (e.g., vertical line segment surrounded by a large number of horizontal lines) is statistically much more rare, therefore inhibitory connections for such occurrence are much weaker. In consequence the response of a neuron representing such "unexpected features" is stronger, as the otherwise present inhibition is lacking.

From an evolutionary point of view sensitivity to such unexpected stimuli is beneficial. It allows one to quickly detect anomalies in the visual scene, which often indicate behaviorally relevant information (e.g., a ripe, red fruit among green leaves; a dangerous predator hiding in the bushes).

SUMMARY

One aspect of the disclosure relates to a method of determining a distance to an object using at least a robotic device. The method in one embodiment includes: interleaving left and right images of the device surroundings to produce a video stream; evaluating the video stream to determine a distance to an object in a visual scene associated with the surroundings visual scene; and causing the robotic device to execute an action in based at least in part on the distance. The left and the right images may be provided by a left and right camera, respectively, the right camera disposed spatially from the left camera on the device. The interleaving and encoding may cooperate to effectuate the reduction in the energy use compared to executing the action without the interleaving.

Another aspect of the disclosure relates to a method of operating a robotic device. The method in one embodiment includes: obtaining an image of a visual scene during trajectory navigation by the device; transforming the image; determining a map based on an operation on pixels of the transformed image and pixels of the image; and determining a salient feature based on an evaluation of the map; and adjusting the trajectory in accordance with a parameter of the salient feature.

In some implementations, the map determination may comprise determination of color distance.

In some implementations, the method may comprise determining a shape characteristic of the feature. The parameter may comprise the characteristic.

In some implementations, the characteristic may be configured to characterize a circularity of the feature.

In some implementations, the method may comprise: obtaining a plurality of images image of the visual scene; determining motion flow information based on an operation on the image and one other image of the plurality of images; and tracking the feature through individual ones of the plurality of images based on the motion information.

Yet another aspect of the disclosure relates to a method of tracking an object in a sequence of images. The method may comprise: determining a saliency measure based on analysis of pixels of an image of the sequence of imaged; and providing the saliency measure to a tracking process, the tracking process configured to determine representation of the object in individual ones of the sequence of images.

In some implementations, the analysis of pixels may be configured based on pixel color. The determination of the saliency measure may comprise determining a color distance configured to maximize discriminability between the target and background.

In some implementations, the determination of the saliency measure may comprise determining orientation of the feature to initialize a color distance computation to maximize discriminability between the target and the background.

In some implementations, the method may comprise determining orientation saliency to initialize a tracker pick the salient object.

In some implementations, the method may comprise using distance saliency to initialize a tracker.

In some implementations, the method may comprise using color saliency to pick a number of object colors to maximize discriminability from the background.

Still another aspect of the disclosure relates to a controller of a robotic apparatus. The controller may comprise a sensor processing component configured to analyze sensor input. The sensor input analysis may be configured to: determine color saliency; initialize a tracking process using the color saliency; determine a salient feature; operate the tracking process to detect the feature; and communicate tracking information to a controller component configured to adjust trajectory of the robotic device in accordance with a characteristic of the feature.

In some implementations, the salient feature determination may be configured based on color saliency. The salient feature information may be automatically provided to the tracking process. The feature may comprise an object. The trajectory adjustment may be configured to reduce spatial separation between the object and the apparatus.

In some implementations, the controller may comprise a manipulator. The trajectory adjustment may comprise operating the manipulator to pick up the object.

In another aspect of the present disclosure, a non-transitory computer-readable apparatus is disclosed. In one embodiment, the non-transitory computer-readable apparatus includes a storage medium having a plurality of instructions thereon, the plurality of instructions being configured to, when executed by a processor apparatus, cause a robotic device to: obtain one or more images during navigation of a trajectory; transform the obtained one or more images via application of a low-pass operation thereto; determine a saliency map based upon a difference between (i) a given pixel of a given image of the obtained one or more images and (ii) an average value of pixels of a corresponding image of the transformed one or more images; determine a salient feature based on an evaluation of the saliency map; and adjust the trajectory of the robotic device in accordance with the determined salient feature.

In another aspect of the present disclosure, another method of operating a robotic platform is disclosed. In one embodiment, the method includes receiving a sensory input; determining a color saliency of the sensory input; initializing a tracking process using the determined color saliency; identifying a salient feature using the tracking process; communicating tracking information to a controller component; and based on the communicated tracking information, causing an adjustment of a trajectory of the robotic platform in accordance with a characteristic of the salient feature.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
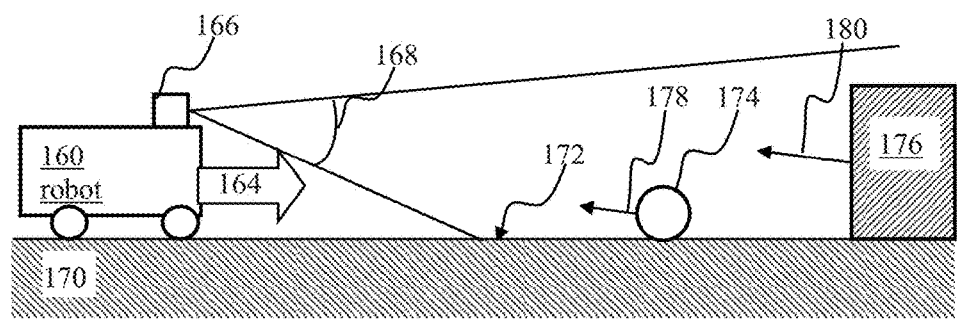
FIG. 1 is a graphical illustration depicting a robotic apparatus comprising an feature detection apparatus of the disclosure, configured for autonomous navigation, in accordance with one or more implementations.

All Figures disclosed herein are © Copyright 2014-2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" or "interface" refers to any signal, data, or software interface with a component, network or process including, without limitation, those of the FireWire (e.g., FW400, FW800, and/or other FireWire implementation.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, among other things, apparatus and methods for determining salient features in sensor data. In some implementations, the sensor data may comprise images of a visual scene obtained using a video camera. The video information may comprise for example multiple streams of frames received from a plurality of cameras disposed separate from one another. Individual cameras may comprise an image sensor (e.g., charge-coupled device (CCD), CMOS device, and/or an active-pixel sensor (APS), photodiode arrays, and/or other sensors). In one or more implementations, the stream of frames may comprise a pixel stream downloaded from a file. An example of such a file may include a stream of matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) may be applicable to and useful with various implementations of the present disclosure. Furthermore, data frames corresponding to other (non-visual) signal modalities such as sonograms, infrared (IR), radar or tomography images may be compatible with the processing methodology of the disclosure, or yet other configurations.

The salient feature detections processing methodology described herein may enable a controller of a robotic device to detect targets and/or obstacles that may be present during trajectory navigation by the device, e.g., 160 of FIG. 1.

FIG. 1 depicts a mobile robotic apparatus comprising a feature detection apparatus configured, e.g., in accordance with the exemplary implementations illustrated below. The robotic apparatus 160 may comprise a camera 166. The camera 166 may be characterized by a field of view 168 (e.g., an extent of the observable world that may be captured by the camera lens at a given moment). The camera 166 may provide information associated with objects within the field of view 168. In some implementations, the camera 166 may provide frames of pixels of luminance and/or color, refreshed at 25 Hz frame rate. However, it will be appreciated that, in some implementations, other frame rates may be used (whether constant or variable), as may other types of information provided by the camera(s) 166.

One or more objects (e.g., a floor 170, a stationary object 176, a moving object (e.g., ball 174), and/or other objects) may be present in the camera field of view. The motion of the objects may result in a displacement of pixels representing the objects within successive frames, such as is described in co-owned and co-pending U.S. patent application Ser. No. 13/689,717 filed on Nov. 29, 2012 and entitled "APPARATUS AND METHODS FOR OBJECT DETECTION VIA OPTICAL FLOW CANCELLATION", incorporated herein by reference in its entirety.

When the robotic apparatus 160 is in motion, such as shown by arrow 164 in FIG. 1B, motion of the objects within the camera 166 field of view 168 (e.g., denoted by arrows 172, 178, 180 in FIG. 1B) may comprise the self-motion component and the object motion component. By way of a non-limiting example, motion of objects in FIG. 1 may comprise apparent motion 180 of the stationary background 176 and the boundary (e.g., the component 172 associated with the floor boundary); (ii) component 178 associated with the moving ball 174 that comprises a superposition of the ball displacement and motion of the camera; and/or other components. As noted previously, determination of the ball 174 motion may be particularly challenging when the camera 160 is in motion (e.g., during panning) and/or when the field of view is changing (e.g., when zooming in/out).

Using relative aspects of an image may allow mitigation of certain problems related to lighting invariance. For example, the absolute color of the object and background) may vary widely depending on illumination, but relative saliency will often be preserved. These aspects of saliency may make it a useful perceptual input to an autonomous robotic platform.

In a computer system, an equivalent of saliency may be determined in a number of ways based on input images represented in one of the typical ways (e.g., RGB, YUV, HSV). Given some signal characterized by a spatial extent (e.g., an image or array of pixels representing a color or luminance), the system may determine a new array which for every spatial coordinate of the original input characterizes the likelihood of that input value. The lower the likelihood the greater the saliency of that particular area, in accordance with some implementations.

In this approach, the saliency may be determined using a back projection of the color histogram of the image. In some implementations, the saliency of individual pixels of the image may be characterized by the number of pixels representing the same exact value in the rest of the image. For example, there may be 300000 pixels having value 128 in the image and only 1000 pixels carrying value 0. In such case, the latter pixels may be less likely given the statistics of the image and therefore are a lot more salient. In some implementations, the saliency determination may be realized by one or more of the following steps:

Determine the histogram H of pixel values of the input image I.

Create a new image B (same size as the original) called back projection, in which every pixel carries the count of the pixels having the same value as the pixel in the original image at that location, that is:

$$B[x,y]=H[I[x,y]] \qquad \text{(Eqn. 1)}$$

Create a new image S called saliency, which may be determined from B in a number of ways e.g.:

$$S[x,y]=1/(B[x,y]+\text{const}) \qquad \text{(Eqn. 2)}$$

or $$S[x,y]=\text{const}-B[x,y]/f(B) \qquad \text{(Eqn. 3)}$$

where f(B) may be a norm. Other expressions are possible depending on what is the desired range and precision of S.

Figure 2A:
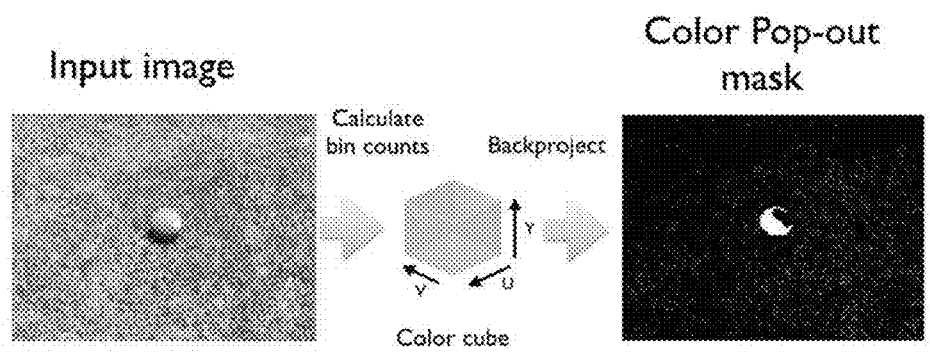
FIG. 2A is a plot illustrating use of saliency mask for feature detection using in a YUV color space image, according to one or more implementations.

In some cases, determining the full histogram may be impractical, e.g., when pixels can take values in a very large space. For example, in 24 bit RGB (Red, Green, Blue) there are 16.7 million possible pixel values. For most images every value of the image is carried by one or at most a few pixels. Determining the histogram for saliency in such case would provide a very weak signal, as the majority of pixels would be very salient (unique). To improve the dynamic range of such maps, binning may be used. That is, individual bins of the histogram do not correspond to a single value, but rather a range of values. Color spaces are often three dimensional. In these cases (e.g., as illustrated in FIG. 2A), the bins may correspond to cubes tiling the color space. In some implementations, the color space may be tiled uniformly in each direction (e.g., RGB color cube may be subdivided into 27 subcubes each spanning ⅓ of each dimension). In other color spaces where luminance is represented separately from chrominance (color information), e.g., YUV, HSV, etc., the binning may not be uniform (e.g., bins may be larger along the luminance dimension and smaller along chrominance directions). In addition to or as an alternative to binning, clipping the range for bins and/or dynamically placed bin edges may be used. This may allow control of the dynamic range of the saliency map along different aspects of the image. In some implementations, there may be just one bin along luminance direction and many along the chrominance directions. In such case, the saliency may ignore variability of the luminance and the resulting map may be invariant to luminance changes.

In this approach saliency may be determined based on the difference between a pixel and the average value of pixels in a surrounding region. In some implementations, the image I may be convolved with a low-pass kernel (e.g., a Gaussian kernel) to create a low-passed image B. Next the saliency heat map may be generated attributing to individual pixels the distance between a pixel in the original image I and the low-passed image B. This may be summarized in the points below:

Determine a low-passed image B from original image I.
Create a saliency heat map H, where $$H[x,y]=f(B[x,y],I[x,y]),\quad\text{(Eqn. 4)}$$

f being the distance function.

In some implementations, the larger the distance (e.g., the further the pixel from the averaged value of its surround), the more salient it is. Distance function f may be a Euclidean distance (e.g., determined on the values of pixels), some form of Manhattan distance (e.g., sum of absolute values of differences between coordinates). Similarly to color pop-out the distance may amplify or ignore certain aspects of the image (e.g., ignore distances in luminance and only process chrominance).

The same methodology as for the above pop-out determination for color may be extended to other features and/or representations of image. For example, the dominant orientation may be determined across an image. The orientation may be characterized by a set of parameters including one or more of angle, phase, frequency, contrast, and/or other parameters. A new image may be generated from the original input image whose pixel values will represent the properties of orientation as above. A saliency determination may be carried out on such processed image in the same way as on color images. In this case, however, the saliency may detect anomalies in orientation aspects of the image.

The same methodology as described above may be applied to a sequence of images and in particular to aspects which characterize the differences between consecutive images in a sequence. One such aspect is optic flow (e.g., a vector field representing the velocity and direction of motion between frames of an image sequence). There may be multiple ways to estimate motion which will return an estimate on the vector field. This vector field may be seen as a new image which channels are encoding different aspects of motion. This new array of data may be processed in ways similar to those described above, namely global/local statistical analysis along individual or combinations of channels. These analyses may reveal anomalies and/or indicate motion saliency. In some implementations, camera input may represent a view from a moving camera. The majority of the motion may be along a particular direction (e.g., corresponding to the direction of motion of the camera), and therefore may not be salient. Some object, however, may be moving independently and its motion may be perceived as salient. In some implementations, a system may control its movements and observe the environment through a camera. Certain motor commands (e.g., forward, left) may be associated with particular motion flow fields (e.g., left command will generate a relatively uniform motion flow towards right). Given the features of the motion field given the current command, any deviation from that expectation may be marked as salient. For example, if the agent is moving forward it is expecting a motion field origination from the direction of motion and radially expanding towards the sides (looming). If suddenly a portion of the motion flow is convergent, it may indicate an object moving away from an agent. Such an object may be marked salient in some implementations (e.g., when the agent is supposed to follow a moving target).

In systems equipped with sensors that allow for acquisition of a depth map (e.g., time of flight sensor, or stereo camera rig determining disparity, lidar) saliency detection may be performed on the depth information. In such case the salient object may be the object at a distance different than much of the rest of the scene. This map may be particularly useful for autonomous flying drones for detection of obstacles.

Saliency may be used to identify the presence of objects in visual scene. However, that information alone (except for the most trivial of cases with only one very salient object in the scene) may not be sufficient to track objects in complex environments. Additional signals identifying the object of interest may be necessary, according to some implementations. Combining the saliency with object identity masks may allow for robust tracking, even in relatively complex environments.

Objects may be often characterized by color. Color alone, however, may not be a perfect feature to support tracking, as absolute value of color may often vary widely due to illumination changes (e.g., when the object enters a shadow). Even the weak color information may be sufficient to distinguish between the object of interest and other salient objects (if present). To illustrate, a red ball on an orange carpet may become brown when in shadow. In fact, the orange carpet may become red in the shadow. Relying only on absolute color value in this case may lead to substantial errors. But the red ball may likely remain the most salient object whether in shadow or not. Among the salient objects detected on the floor, it may likely still be the reddest. This method may lead to much better tracking performance.

Figure 2B:
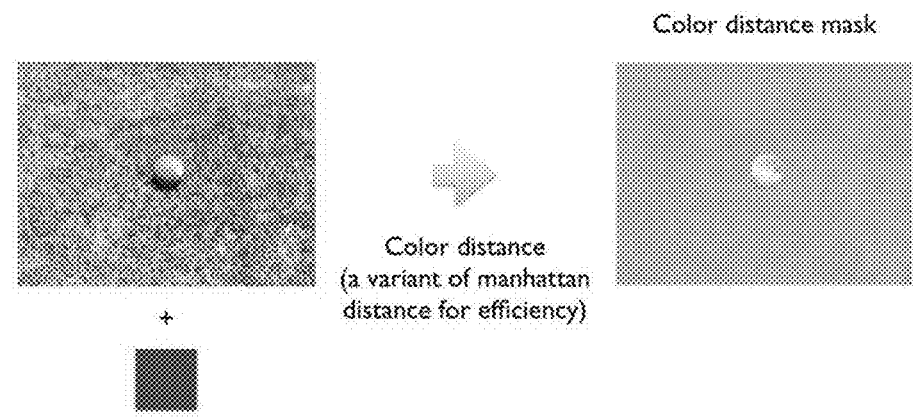
FIG. 2B is a plot illustrating use of color distance for determining a salient feature in an image frame shown in FIG. 2A, according to one or more implementations.

Color distance may be determined in a number of ways, depending on the representation. In some implementations, Euclidean distance in the color space may be used, but this solution may be computationally expensive and may not lead to the best results in certain color spaces. In one such implementation (e.g., such as that shown in FIG. 2B), a version of Manhattan distance may be used in the general form of:

$$f(A,B)=\Sigma\_(i=1)^n \alpha\_i |A\_i - B\_i| \quad\text{(Eqn. 5)}$$

where parameters $\alpha\_i$ are weighting factors which amplify or ignore certain aspects (channels) of image representation. For example, the distance in the luminance direction may be taken with less weight than distance in the chrominance directions.

A typical object may comprise one or more color surfaces (i.e., areas of similar color and reflectance). Color surfaces may be salient when they are sufficiently distinct from the background or surrounding surfaces. Finding a pixel or a small group of pixels with the highest value of color saliency may be used as a first step in determination of the salient color surface. Determining the spatial extent—e.g., the mask—of the most salient color surface in an image or in a time-series of images may be important for two (or more) reasons. First, the mask may provide the statistics of colors (or reflectances) in the most salient color surface. These statistics may allow better evaluation of the color distance between the most salient color surface and the other ones, and/or to better track the salient object as it moves in the environment. For example, the mask of the most salient color surface may be used for choosing the color prototype used in the color distance. Second, the mask of the most salient color surface may provide an estimate of the apparent size of the salient object, and/or may provide a relative distance cue: when the area of the color surface increases, it is likely that the object becomes closer to the viewer, or becomes less occluded by other objects.

To determine the mask—the region of the visual field—occupied by the most salient color surface, the following algorithm may be used, according to some implementations. First, the location of the peak in saliency map (heat map) may be determined. The heat map used may be a purely color-based saliency, or a heat map determined by multiplicatively combining multiple heat maps as described below. It may be beneficial to blur the heat map. Next, either a fixed threshold may be applied or a dynamic approach may be used to provide a Boolean mask or where the target is located.

In some implementations, using a dynamic approach, a threshold in the saliency heat map may be gradually decreased below the peak value, to produce an increasingly large contour around the heat map peak. The threshold lowering may be terminated when the chroma range within the contour exceeds some predetermined numerical value minmax_UV. In YUV color coordinates, the chroma range may, for example, be defined as max(max(U)−min(U), max(V)−min(V)). In YUV coordinates, where U and V are between 0 and 255, minmax_UV may have values between 20 and 40. Larger minmax_UV values may allow for more color variance within a color surface; that is, the algorithm may be more likely to treat adjacent areas of similar chroma as one color surface rather than as distinct color surfaces.

In many cases the objects that are tracked may be characterized by shape information. In general, shape-based characterizations may not be easy and may be computationally intense. There may be some cases, however, where such characterizations may be implemented efficiently.

Circular shapes may be among the easiest to characterize due to symmetries and rotational invariances of a circle. There may be multiple ways of detecting circles, most notably using Hough moments, but this method can sometimes be very slow. A simpler and more efficient process may be carried out by performing one or more of the following steps:

Given a heat map indicating possible locations of objects (e.g., generated as the color pop-out heat map, or via threshold on the color distance or combination thereof), threshold the heat map to obtain outlines of object candidates.

On the thresholded heat map, determine the contours of the object candidates.

For each contour, determine the smallest enclosing circle.

Determine the ratio between the area of the contour and the area of the smallest enclosing circle (this ratio may be referred to as the circularity ratio).

Processing of the circularity ratio through function f may be used to obtain circularity parameter as a result. This step may be used to control the dynamic range of the circle detection. The function f can for example be $f(x)=x^2$, in which case due to the convexity of this function less circular shapes will obtain even smaller circularity parameter.

If the contour is circular, the ratio between its area and the area of minimal enclosing circle may be very close to one. Alternatively, if a contour is, e.g., a line, then the ratio of areas may be close to zero. Because the ratio is determined for all the candidate object areas, an additional object circularity heat map may be generated by performing one or more of the following steps:

Create an empty circularity heat map H.

Sort contours in an increasing order with respect to circularity parameter.

For every contour in the original heat map, draw the smallest enclosing circle of that contour on heat map H. Alternatively draw the contour itself on the heat map H.

The intensity of the fill of the drawn circle (contour) should be proportional to the circularity parameter.

The identity of the tracked object may be estimated by tracking the motion of elements (features) of the object from its current position to a new position. This signal may be noisy, particularly in complex environments filled with different motions. Tracking based solely on such motion information may diverge from the object in short order. However, the estimates from one frame to the next may be relatively accurate and may be used as an additional prior to identify the object of interest (particularly given a strong saliency map that filters out much of the background).

In systems equipped with depth sensors (e.g., time of flight sensor, or stereo camera rig determining disparity, lidar) distance information may provide useful information in maintaining the object of interest. Given a saliency signal which already separates the visual scene into a few candidate locations, the areas at a distance widely varying from the distance to previously tracked location of the object may be discarded, simplifying the tracking task and limiting the number of false positives.

The physical reality may be characterized by continuous changes. Therefore, the tracked object may be unlikely to suddenly disappear from its current location and reappear somewhere else. This fact may be exploited by adding an additional identity signal close to the previous known location of the object. In some implementations, involving a kinematic mask, a simple motion estimate of the object may be determined based on two or more last known previous locations to give an estimate of the next location. A heat map of expected object location may be provided, which may be integrated with other sources of information described herein.

In some implementations, the final heat map determined in a previous time step may be integrated (e.g., as described below) into the determination of the new heat map. In the simplest case, a convex combination of the new evidence with the previous heat map may be used to determine the new heat map. This results in a component of the heat map being a temporarily low-passed version of the signal.

In some implementations, histogram back projection may be used to provide evidence for the tracker. A histogram of color channel (or multiple channels, or channels encoding other features than color) may be determined in the area where the object is present. In subsequent steps, a heat map (such as the one illustrated in FIG. 2A) may be generated by back-projecting the counts of the bins back into the pixel space (that is every pixel in the heat map is proportional to bin count to which the original pixel in the image belongs). In some implementations, the histogram back projection may be determined only on chromatic channels (containing color information) to make the method tolerant to luminance changes. In some implementations, back projection may be performed independently for individual chromaticity (or other feature) channels. In some implementations, the resulting heat map may be obtained by additive, multiplicative, or hybrid integration (e.g., as described below).

In some implementations, specific constraints may exist that may be incorporated into the tracker that can substantially improve tracking performance. For example, in certain applications the object of interest may very rarely appear in a particular location of the visual field, but that same location can often have distractors. In such case, a constant prior map may be engineered and incorporated into the tracking system, to lower the likelihood of object detection at a particular location and enhance in other areas.

In some implementations, certain patterns may exist in the spatial areas where the object appears but these may not be known in advance. For example, an implementation meant to track cars of a particular color may be deployed in a new location. The road may occupy only a part of the visual field. The system while tracking target objects may integrate information about where the objects were detected to enhance generate additional prior heat map. Such a heat map, much like the constant prior map, may limit the number of false positives in the area where the object is statistically unlikely to appear.

Figure 3:
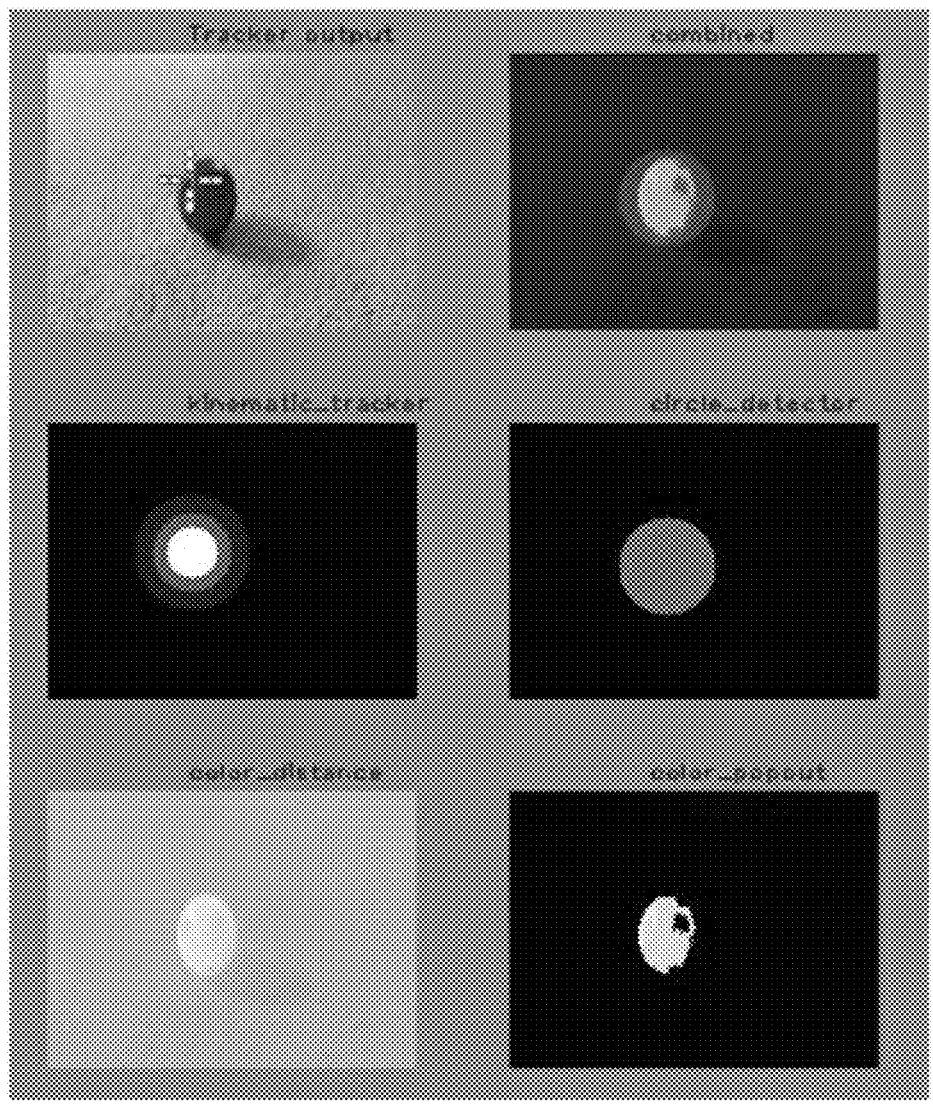
FIG. 3 is a plot presenting exemplary heat maps obtained using methodology described herein, according to one or more implementations.

Typically computer vision trackers may be initialized using mouse and keyboard by giving them the initial bounding box on the tracked object. This method may not be very well suited for autonomous robots or vehicles that need to track because these are not often equipped with a screen and input device. Alternatively, certain color tracking cameras (e.g., PixyCam) use a special button indicating initialization and pick the color of the object present in the center of the visual field of the camera. To indicate the color of the object picked the camera has an LED that outputs the primed color. According to one or more implementations, the tracker may use the saliency mask to find the object of interest and/or may use this mask to prime/initialize one or more trackers. In some implementations, the uninitialized tracker determines the saliency map (e.g., color saliency map). The uninitialized tracker may find candidate objects (salient areas) and select the largest (alternatively the one containing most saturated color, or some weighted combination of those features) area. Once the area is selected, other mechanisms of the tracker responsible for maintaining the identity of the tracked object may be initialized. A color prototype against which the color distance mask may be determined is selected. In some implementations, individual colors contained within the target mask may be tested for its discriminability of determining target versus background using color distance and a fixed threshold. The color from the target which maximizes discriminability may be chosen as the color prototype. Further, once the color prototype has been chosen, the optimal threshold may be determined by trying some or all thresholds, and using the one that maximizes discriminability. In some implementations, a combination of colors and/or other features may be selected. In some implementations, a motion saliency map may be used to estimate the priming object. In such case, priming of the tracker may be equivalent to shaking the object of interest on front of the camera. In some implementations, a distance saliency map may be used to prime the tracker, in which case the object a substantially different distance (e.g., closer) than others may be selected. Many other use cases are possible, in which weighted combinations of the above mentioned saliency masks are combined to select the most salient object for tracking. FIG. 3 presents an exemplary use of a saliency mask (here, a global color saliency mask) to prime other signals identifying the target. In the example, the ball stands out sharply from the background. Filtering and thresholding is applied to obtain a contour of the outstanding object. Next an optimization technique is applied to determine the color, i.e., which object is the best distinguished object from background.

The signals (e.g., heat maps) described above may be integrated in a number of ways to provide a combined map representing the likelihood of presence of the object of interest. In some implementations, the different heat maps may be characterized by a scalar signifying the confidence of the signal. Given confidence $c\_i \in [0,1]$, heat maps may be integrated multiplicatively as follows:

$$C=\Pi\_(i=1)^n((1-c\_i)+H\_ic\_i) \qquad \text{(Eqn. 6)}$$

assuming that $H\_i\,(x,y) \in [0,1]$. In this case, a heat map with confidence $c=0$ may contribute a constant equal to 1 in the product, therefore may not change the result. On the contrary, a heat map with confidence $c=1$ may enter the product possibly significantly changing the result. Note that certain heat maps may be obtained as function of others. For example, the circle detection heat map described above may be obtained from the color saliency map.

Figure 4:
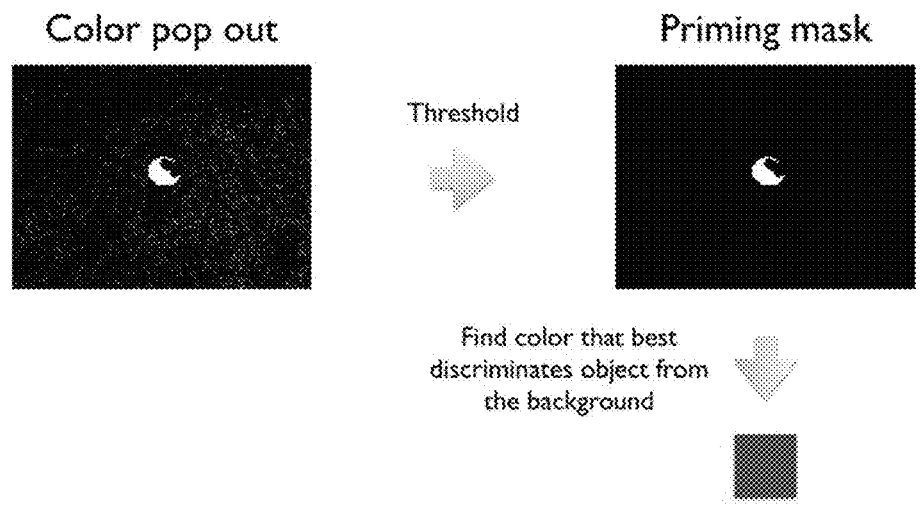
FIG. 4 is a plot illustrating use of a heat map as a priming map for detecting salient feature, according to one or more implementations.

FIG. 4 illustrates use of integration of 3 different heat maps in a multiplicative way, in accordance with one or more implementations.

In some implementations, the final heat map may be generated as a weighted sum of the individual heat maps as follows:

$$C=\Sigma\_(i=1)^n\alpha\_iH\_i \qquad \text{(Eqn. 7)}$$

Figure 5:
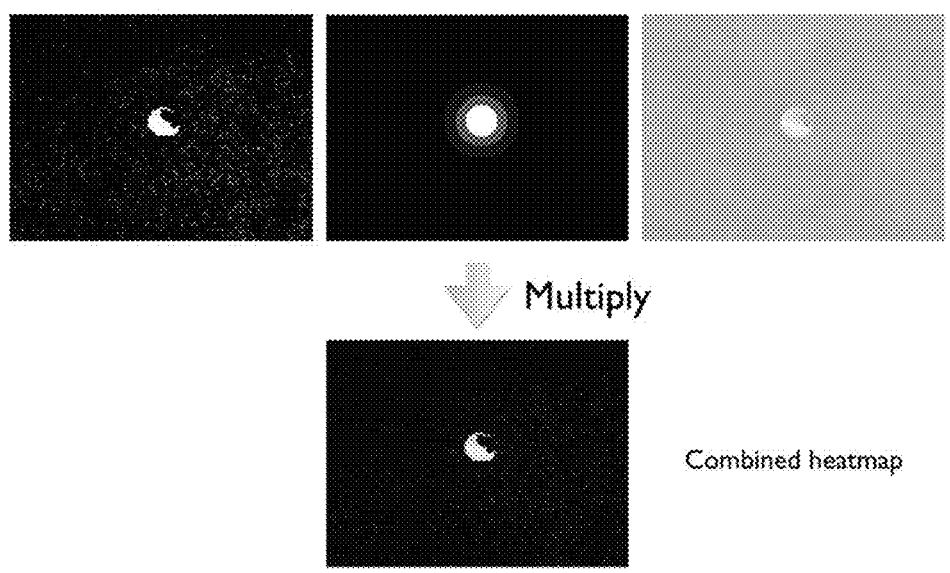
FIG. 5 is a plot illustrating use of multiple heat maps for salient feature detection, according to one or more implementations.

In certain applications, a combination of additive and multiplicative integration techniques may be used, as illustrated in FIG. 5. For example, certain heat maps may have the ability to exclude certain positions from being considered as containing the object. For example, if it is known that the object of interest will always be within a given distance from the device, a depth heat map may have a set detection threshold at that distance (e.g., everything further than the given distance is encoded as zero) may be integrated multiplicatively (e.g., if the heat map is zero in some location then, that area may be safely excluded from consideration regardless of other evidence/information). In some cases, the evidence may not have excluding properties of the object of interest characterized by a color and shape, than if one of those features is absent (e.g., due to particular illumination), the area may still be considered as possible location of the object. In such case, those heat maps may be combined additively. Overall integration scheme can therefore be a hybrid of additive and multiplicative schemes, according to some implementations.

Given the final combined heat map the tracker may be configured to determine the target object location and/or bounding box. Various techniques and heuristics may be used at that stage to further estimate if the tracker is still following the object of interest.

The bounding box may be determined in a number of ways. In some implementations, a flood fill on the color distance originating at the peak of the combined heat map with a tolerance may be performed to estimate a connected component containing the combined heat maps peak. Next the bounding box may be determined as the smallest enclosing rectangle of the connected component. In some implementations, the flood fill may be determined on the color pop out heat map. In some implementations, the flood fill may be determined on the summed, threshold heat maps for more than one modality (for example color distance and color pop out). In some implementations, the connected component may be determined directly on the combined (multiplicative)

heat map. This may be advantageous in cases where the object is not characterized by a very distinctive color and therefore the color distance alone is providing a weak signal. At the same time this method may be disadvantageous in cases when properties of previously determined bounding box are used to determine the new heat map (e.g., one of the heat maps used to estimate new object location is a heat map composed of the previous bounding box) as in such case accumulation of error may occur.

In some cases the tracked object may contain multiple colors. Presence of multiple colors in close vicinity may simplify tracking. In some implementations, the initial area of interest as provided by the saliency heat map (pop-out mask) may be analyzed and a number of distant (in color space), saturated color prototypes may be acquired. For individual prototypes, a color distance mask may be determined in subsequent frames. For a given new frame, a set of candidate object locations may be established based on saliency mask. For individual candidate regions, a set of minimal distances to saved color prototypes may be determined. A logical analysis may performed to find the area giving best match. In one instance the condition may be that an area is rejected if one of the color distances exceeds a pre-established threshold. In some cases, this threshold may be different for different color prototypes, e.g., being a function of color discriminability from the first (priming frame). In some implementations, a weighted sum of minimal color distances may be determined and compared to a threshold. In such case even if one of the colors from the prototype set is missing from the area of interest (large distance), the presence of other colors from the prototype set may drag the sum down and eventually be accepted as possible location of the target.

In some cases there may be multiple objects in the scene that pass the tracking criteria. In some implementations, the tracker may return positions and bounding boxes of all of those locations. In some implementations, the tracker may return the position of the largest region of interest. In some implementations, the tracker will return the region closest to the previously returned location.

The output of the tracker may be used to drive robotic behavior, particularly as an input to a system predicting the next motor action of a robot (referred to as predictor in the following section). Various ways of representing the tracker output may be used for that application.

In this case, the tracker logic may make the decision if the object of interest is still present in the visual field. If it is, the tracker may output the bounding box of the object in visual space coordinates. If the object is absent, a special signal may be sent to indicate that (e.g., a bounding box with negative coordinates or a null object). Before entering the predictor (which for example maybe implemented a neural network having a plurality of input units) the tracker output may be converted to a form more suitable for subsequent processing. In some implementations, the actual bounding box may be converted to a heat map that is zero outside of the box and one inside. That pseudo heat map may be passed through a preprocessing layer of neurons having spatial receptive fields covering the visual space. Individual neurons may get activated proportionally to the fraction of the receptive field occupied by the box (value one). Therefore, a neuron which has only zeros in its receptive field may not be activated (activation zero), while the one whose entire receptive field is occupied by the box (value one) may be fully activated. The vector of such activations may become the actual input of the predictor. In some implementations, the center coordinates of the bounding box, together with its width and height may be feed as inputs.

In some implementations, the decision of whether the tracker still follows the object of interest may be avoided altogether and passed onto the behavior prediction system. In this case the integrated system (robot together with behavior predicting system) may learn the behaviors relevant for the "tracked" object. In some instances a final heat map of object presence may be passed directly to the predictive system. In some implementations, the heat map may be passed through a preprocessing layer (e.g., as described in the paragraph above). In some implementations, the location of the peak of the heat map, together with the value at the peak and an estimate of the size of the peak at half of the maximal value, may be passed to the predictive system.

By avoiding the classification (decision if the object is tracked or not) the predictive system may take into account additional information not available to the tracker on whether the final heat map contains behaviorally relevant information. For example, the predictive system may learn to adjust the threshold for the detection based on one or more of the position/orientation of the robot, time of day, and/or other aspects inaccessible to the tracker.

Parts of the above described methodology are applicable to other modalities. For example, much of the visual tracking methods are applicable in thermography, sonar data, radar data, and/or other applications. Saliency detection may be carried out in sonography, for example, by determining relevant histograms on the spectral representation of the time slice of sound.

Figure 6:
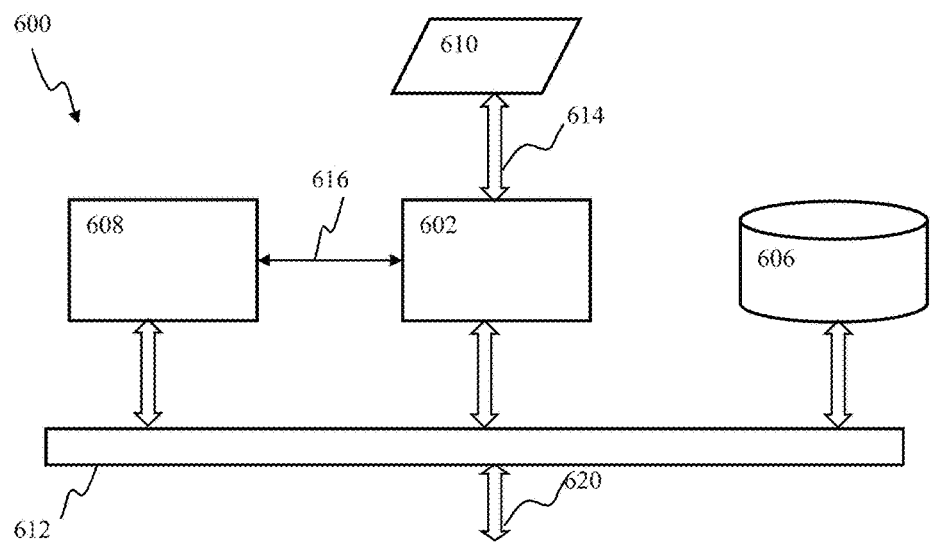
FIG. 6 is a functional block diagram depicting a computerized data processing system configured for salient feature detection, according to one or more implementations.

Various computerized devices may be employed for implementing methodology described herein. One particular implementation of the computerized neuromorphic processing system, for use with an adaptive robotic controller is illustrated in FIG. 6. The computerized system 600 of FIG. 6 may comprise an input device 610, such as, for example, an image sensor and/or digital image interface. The input interface 610 may be coupled to the processing block (e.g., a single or multi-processor block) via the input communication interface 614. In some implementations, the interface 614 may comprise a wireless interface (cellular wireless, Wi-Fi, Bluetooth, etc.) that enables data transfer, e.g., to the processor 602 from remote input/output (I/O) interface 610. One such implementation may comprise a central processing apparatus coupled to one or more remote camera devices providing sensory input to the adaptive predictor block (e.g., as described in co-owned and co-pending U.S. patent application Ser. No. 13/842,562 entitled "ADAPTIVE PREDICTOR APPARATUS AND METHODS FOR ROBOTIC CONTROL", filed Mar. 15, 2013, the foregoing being incorporated herein by reference in its entirety.

The system 600 further may comprise a random access memory (RAM) 608, configured to store neuronal states and connection parameters and to facilitate synaptic updates. In some implementations, synaptic updates may be performed according to the description provided in, for example, in co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 608 may be coupled to the processor 602 via a direct connection 616 (e.g., memory bus). The memory 608 may also be coupled to the processor 602 via a high-speed processor bus 612.

The system 600 may comprise a nonvolatile storage device 606. The nonvolatile storage device 606 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 606 may be used to store state information of the neurons and connections for later use and loading previously stored network configuration. The nonvolatile storage 606 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 600 may be coupled to one or more of an external processing device, a storage device, an input device, and/or other devices via an I/O interface 620. The I/O interface 620 may include one or more of a computer I/O bus (PCI-E), wired (e.g., Ethernet) or wireless (e.g., Wi-Fi) network connection, and/or other I/O interfaces.

In some implementations, the I/O interface may comprise a speech input (e.g., a microphone) and a speech recognition module configured to receive and recognize user commands.

It will be appreciated by those skilled in the arts that various processing devices may be used with computerized system 600, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 7:
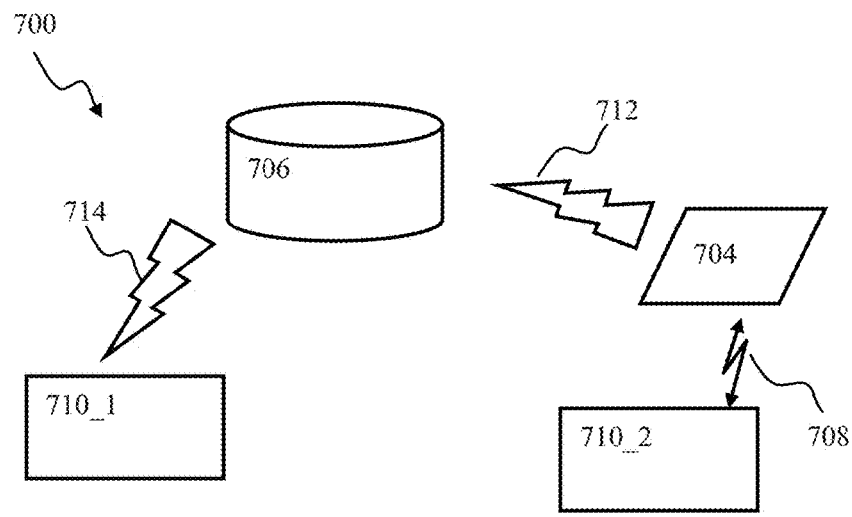
FIG. 7 is a functional block diagram depicting a system comprising salient feature detection apparatus, according to one or more implementations.

FIG. 7 illustrates a computerized system comprising a learning controller apparatus of the present disclosure, in accordance with one implementation. The system 700 may comprise a computerized entity 706 configured to communicate with one or more learning controllers 710 (e.g., 710_1, 710_2). In some implementations, the entity 706 may comprise a computing cloud entity (e.g., a cloud service or a server in a public, private or hybrid network). In one or more implementations, the entity may comprise a computer server, a desktop, and/or another computing platform that may be accessible to a user of the controller 710. In some implementations of the cloud computing services, one or more learning controller apparatus 710 may communicate with the entity 706 in order to access computing resources (e.g., processing cycles and/or memory) in order to, e.g., detect features and/or objects in sensory data provided by, e.g., sensor module 172 of control system in FIG. 1. In some implementations, the learning controller apparatus 710 may communicate with the entity 706 in order to save, load, and/or update, their processing configuration (e.g., learning configuration 812 in FIG. 8). The robotic brain images may comprise executable code (e.g., binary image files), bytecode, an array of weights for an artificial neuron network (ANN), and/or other computer formats. In some implementations, the learning controller apparatus 710 may communicate with the entity 706 in order to save and/or retrieve learned associations between sensory context and actions of a robot, e.g., as described in co-owned and co-pending U.S. patent application Ser. No. 14/244,888, entitled "LEARNING APPARATUS AND METHODS FOR CONTROL OF ROBOTIC DEVICES VIA SPOOFING", filed Apr. 3, 2014 and incorporated herein by reference in its entirety.

In FIG. 7, one or more learning controller apparatus (e.g., 710_1) may connect to the entity 706 via a remote link 714, e.g., WiFi, and/or cellular data network. In some implementations, one or more learning controller apparatus (e.g., 710_2) may connect to the entity 706 via a local computerized interface device 704 using a local link 708. In one or more implementations, the local link 708 may comprise a network (Ethernet), wireless link (e.g. Wi-Fi, Bluetooth, infrared, radio), serial bus link (USB, Firewire, etc.) and/or other. The local computerized interface device 704 may communicate with the cloud server entity 706 via link 712. In one or more implementations, links 712 and/or 714 may comprise an Internet connection, and/or other network connection effectuated via any of the applicable wired and/or wireless technologies (e.g., Ethernet, Wi-Fi, LTE, CDMA, GSM, and/or other).

In one or more applications that may require computational power in excess of that that may be provided by a processing module of the learning controller 710_2 the local computerized interface device 704 may be used to perform computations associated with training and/or operation of the robotic body coupled to the learning controller 710_2. The local computerized interface device 704 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

Figure 8:
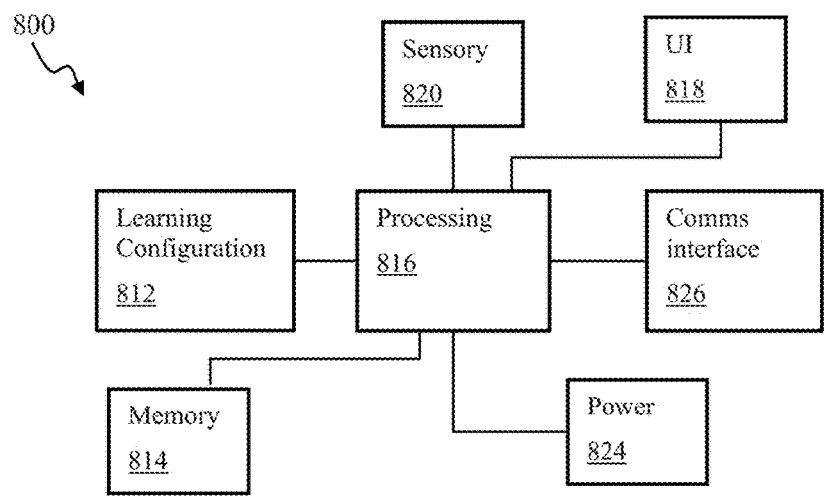
FIG. 8 is a functional block diagram depicting the salient feature detection apparatus of, e.g., FIG. 7, according to one or more implementations.

FIG. 8 is a functional block diagram detailing components of a learning apparatus (e.g., apparatus 160 of FIG. 1) in accordance with one implementation. The learning apparatus 800 may comprise a memory component 812 configured to store a learning configuration. In one or more implementations, the learning configuration may comprise an array of efficacies of an artificial neuron network and/or contents of a lookup table. Additional memory 814 and processing capacity 816 is available for other hardware/firmware/software needs of the apparatus. The processing component 816 may interface to the sensory component 820 in order to obtain and process sensory data for, e.g., object detection, face tracking, stereo vision, and/or other tasks.

The processing component may interface with electro-mechanical, user interface (UI) 818, sensory 820, electrical, power 824, and communications interface 826 components via driver interfaces and/or software abstraction layers. Additional processing and memory capacity may be used to support these processes. It will be appreciated that these components may be fully controlled by the robotic brain. The memory and processing capacity may aid in management of learning configuration (e.g., loading, replacement), operations during a startup, and/or other operations. Consistent with the present disclosure, the various components of the device may be remotely disposed from one another, and/or aggregated. For example, the learning configuration may be executed on a server apparatus, and control the mechanical components via network or radio connection while memory or storage capacity may be integrated into the brain. Multiple mechanical, sensory, or electrical units may be controlled be a learning apparatus via network/radio connectivity.

The electro-mechanical components may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, and/or other electro-mechanical components. The electro-mechanical components may further include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The user interface components 818 may comprise virtually any type of device capable of registering inputs from and/or communicating outputs to a user. These may include, without limitation, display, touch, proximity sensitive interface, light, sound receiving/emitting devices, wired/wireless input devices and/or other devices.

The sensory devices 820 may enable the learning apparatus to accept sensory input from external entities. These may include, without limitation, video, audio, capacitive, radio, vibrational, ultrasonic, infrared, and temperature sensors radar, lidar and/or sonar, and/or other sensory devices.

Electrical components used in the illustrated implementation (not shown) may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The communications interface 826 may include one or more connections to external computerized devices to allow for, inter alia, management of the robotic device, e.g., as described above with respect to FIG. 1 and/or with respect to FIG. 7. The connections may include any of the wireless or wireline interfaces discussed above, and further may include customized or proprietary connections for specific applications. In some implementations, the communications interface 826 may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the learning controller apparatus (e.g., 710 in FIG. 7) and a remote computing entity (e.g., 706, 704 in FIG. 7).

The power system 824 may be tailored to the needs of the application of the device. For example, for a small-sized lower power appliance, a wireless power solution (e.g. battery, solar cell, inductive (contactless) power source, rectification, and/or other) may be appropriate. For building management applications, battery backup/direct wall power may be superior. In addition, in some implementations, the power system may be adaptable with respect to the training of the appliance apparatus (e.g., such as described in co-owned and co-pending U.S. patent application Ser. No. 14/489,242, entitled "APPARATUS AND METHODS FOR REMOTELY CONTROLLING ROBOTIC DEVICES", filed Sep. 17, 2014 and incorporated herein by reference in its entirety). The training may improve operational efficiency of the appliance (to include power consumption efficiency) through learned management techniques specifically tailored to the tasks performed by the appliance apparatus.

Figure 9:
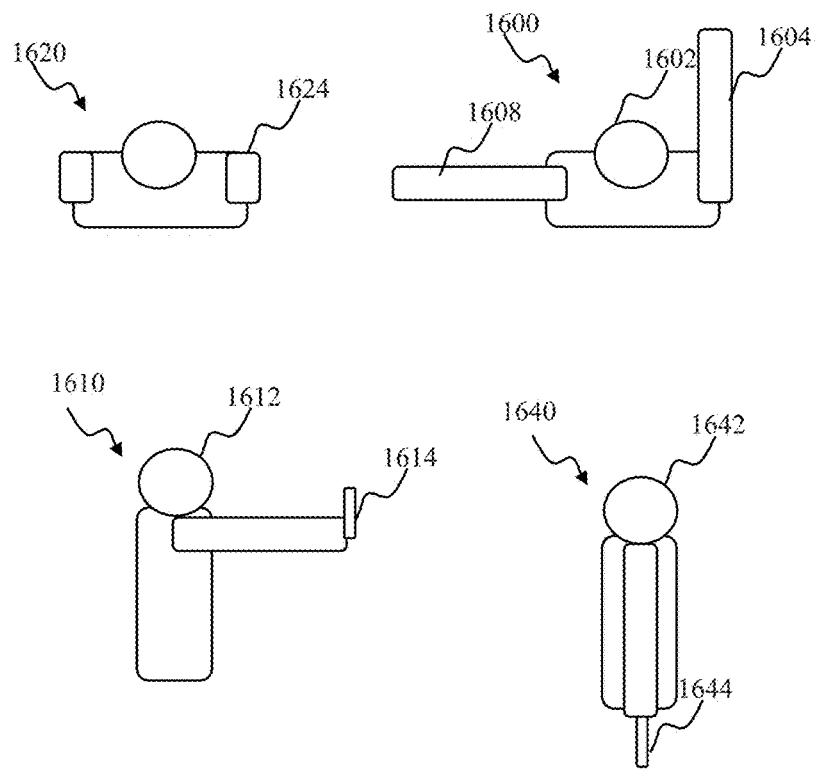
FIG. 9 illustrates gestures of a human operator used for communicating control indications to a robotic device, gestures being detectable by a salient feature detection system of, e.g., FIGS. 6-7, in accordance with one or more implementations.

FIG. 9 illustrates four different gestures of a human operator used for communicating control indications to a robotic device comprising distance determination apparatus described herein, in accordance with one or more implementations.

At the top left of FIG. 9 is a top view of a user and may illustrate a base posture 1620 of the user, with arm 1624 at a base state. The diagram at the top right depicts user gestures 1600 communicating a right turn action to a robotic device (e.g., the vehicle 160 in FIG. 1). The robotic device 160 may utilize stereo images provided by the cameras 166 in order to detect position of the user arms 1604, 1608. In some implementations, the arm 1604, 1608 position may be determined using the distance determination methodology configured based on encoding interleaved left/right portions of the stereo imagery. By way of an illustration, the gesture 1600 may be determined based on a comparison of distance between the robot and the user arms in positions 1604, 1608 relative the user arms in position 1624 (top left). In one or more implementations, the gesture 1600 may be determined based on a comparison of distance between the robot and the user arms in positions 1604, 1608 relative the user head 1602.

At the bottom left of FIG. 9 is a side view of the user and may depict user gesture 1610 communicating a stop action to a robotic device (e.g., the vehicle 160 in FIG. 1). The robotic device 100 may utilize stereo images provided by the camera(s) 166 in order to detect position of the user arms, head 1612, 1642, and/or hands 1614, 1644. In some implementations, the hand 1614, 1644 position may be determined using the distance determination methodology configured based on encoding interleaved left/right portions of the stereo imagery. By way of an illustration, the gesture 1610 may be obtained based on a comparison of distance between the robot and the user hands in position 1614 relative the user hand in position 1644 in gesture 1640 at the bottom right of FIG. 9D. In one or more implementations, the gesture 1610 may be determined based on a comparison of distance between the robot and the user hand in position 1614 relative the user head 1612 in FIG. 9C. In some implementations (not shown) the user may communicate an indication to the robotic device by, e.g., appearing in view of the camera. By way of an illustrative example, the user stepping in front of the vehicle may indicate to the vehicle a stop action.

Figure 10:
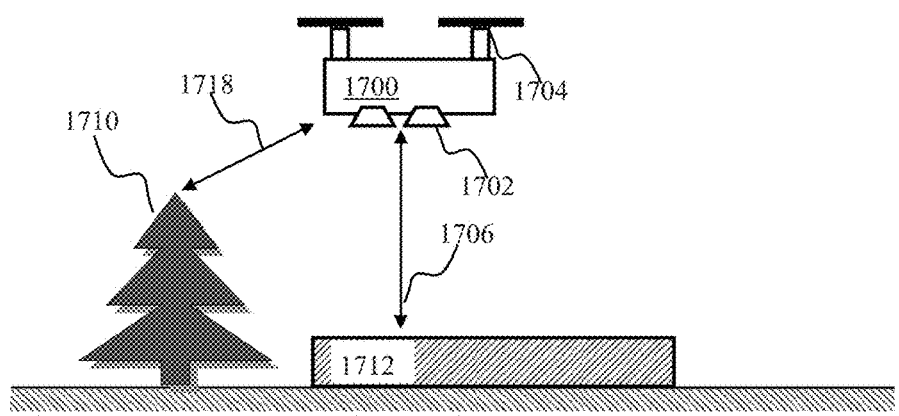
FIG. 10 is a graphical illustration depicting an exemplary unmanned robotic apparatus comprising salient feature determination apparatus of the disclosure configured for autonomous navigation, in accordance with one or more implementations.

FIG. 10 illustrates use of distance determination methodology by an unmanned robotic apparatus configured for autonomous navigation, in accordance with one or more implementations. The unmanned autonomous vehicle (AUV) 1700 may comprise a plurality of cameras 1702 disposed spatially from one another. Video stream provided by the cameras 1702 may be interleaved and encoded using any applicable methodology described herein (e.g., with respect to FIGS. 3, 6, and/or 9). The encoding may enable a controller of the vehicle 1700 to determine distance 1706 between the vehicle 1700 and the landing location 1712, and/or distance 1718 to obstacles (e.g., a tree 1710). The controller may utilize the distance and/or vehicle motion information to control actuators 1704 when landing, during take-off and/or navigating around obstacles.

In some implementations, the saliency of an item (such as an object, a person, a pixel, and/or other) may be described by a characteristic by which the item may stand out relative to its neighbors. For example, a salient vehicle may comprise a vehicle that may be moving differently (e.g., going slower/faster than the rest of the traffic, weaving from lane to lane) compared to the rest of the traffic. A salient object for target approach may comprise a stationary and/or moving ball on a moving background due to self-motion by the vehicle.

Figure 11:
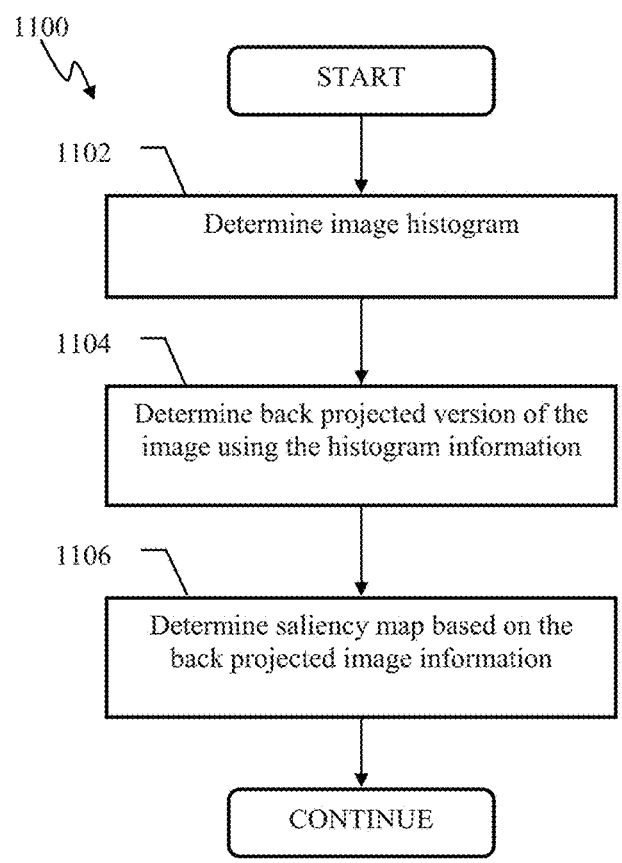
FIG. 11 is a logical flow diagram illustrating a method of determining a salient feature using encoded video motion information, in accordance with one or more implementations.

Referring now to FIG. 11, a logical flow diagram of one embodiment of a method 1100 of determining a salient feature using encoded video motion information in accordance with one or more implementations is shown. In step 1102, a histogram of an input image is determined. For example, in one such implementation, the value (e.g., 0 or 128) of each pixel of the image is determined. The number of occurrences of each pixel value are counted and analyzed, e.g., the numbers of each pixel value are compared to determine which values are more or less likely or frequent, the less likely pixels being more unique and thus more salient.

In step 1104, a new image or a back projection is created based on the histogram information of the input image. Each pixel of the back projected version of the input image is associated with the pixel count of the pixel at that location. For example, if the input image has 320,000 pixels with pixel value 0, and a first pixel of the input image has the value 0, the first pixel of the back projected image has a pixel count of 320,000 at the location of the first pixel. In step 1106, a saliency map or mask may be created based on the back projected image information. The back projected image and/or the saliency map may be useful for creating an image that clearly delineates salient objects from the background, such as that shown in FIG. 2A.

Figure 12:
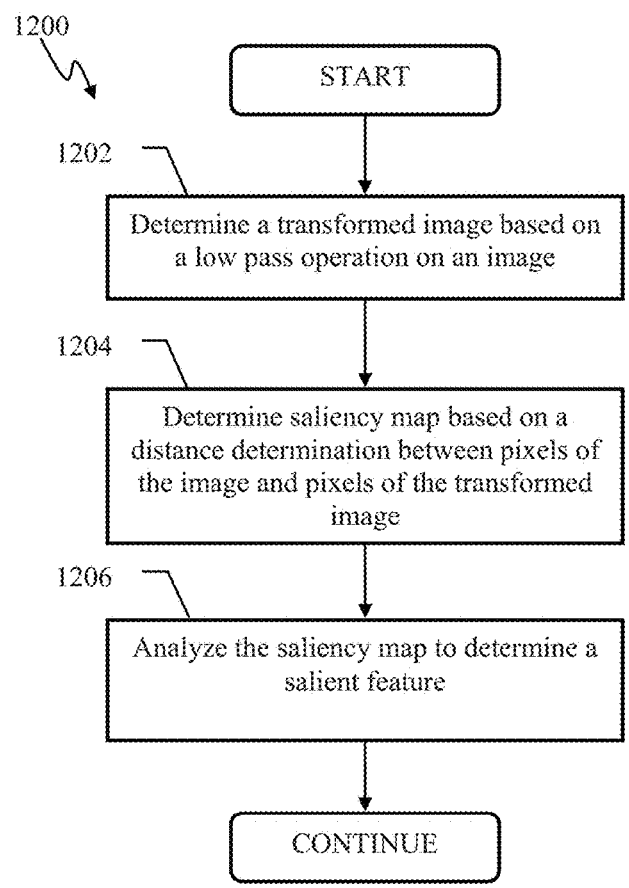
FIG. 12 is a logical flow diagram illustrating a method of data processing useful for determining features, in accordance with one or more implementations.

In FIG. 12, a logical flow diagram of one embodiment of a method 1200 of data processing useful for determining features in accordance with one or more implementations is shown. In contrast to an approach wherein saliency determined based solely on a histogram is/becomes impractical, e.g., most of the pixels are salient (unique) and give a weak signal, other approaches such as a low-pass image filtering may be utilized. In step 1202, an input image is transformed based on a low-pass operation on the image. In one embodiment, a Gaussian kernel is applied to the input image to create the transformed image. In step 1204, a saliency map may be determined based on the difference between a pixel and the average value of pixels in a surrounding region. The saliency map comprises pixels that each have a parameter associated with distance between the original image and the low-passed image.

In step 1206, the saliency map determined in step 1204 is analyzed to determine a salient feature. In certain embodiments, the further the pixel from the average value of the surrounding region (i.e., the distance is larger), the more salient the pixel is. Such distance may be determined in various ways, such as a function based on Euclidean distance or Manhattan distance. Furthermore, certain features of the image may be enhanced or deemphasized, e.g., only process chrominance, disregard luminance. Orientation parameters may be included in the pixel value, such as angle, phase, frequency, contrast, etc. that may be used to detect differences in orientation in salient features of the image.

Figure 13:
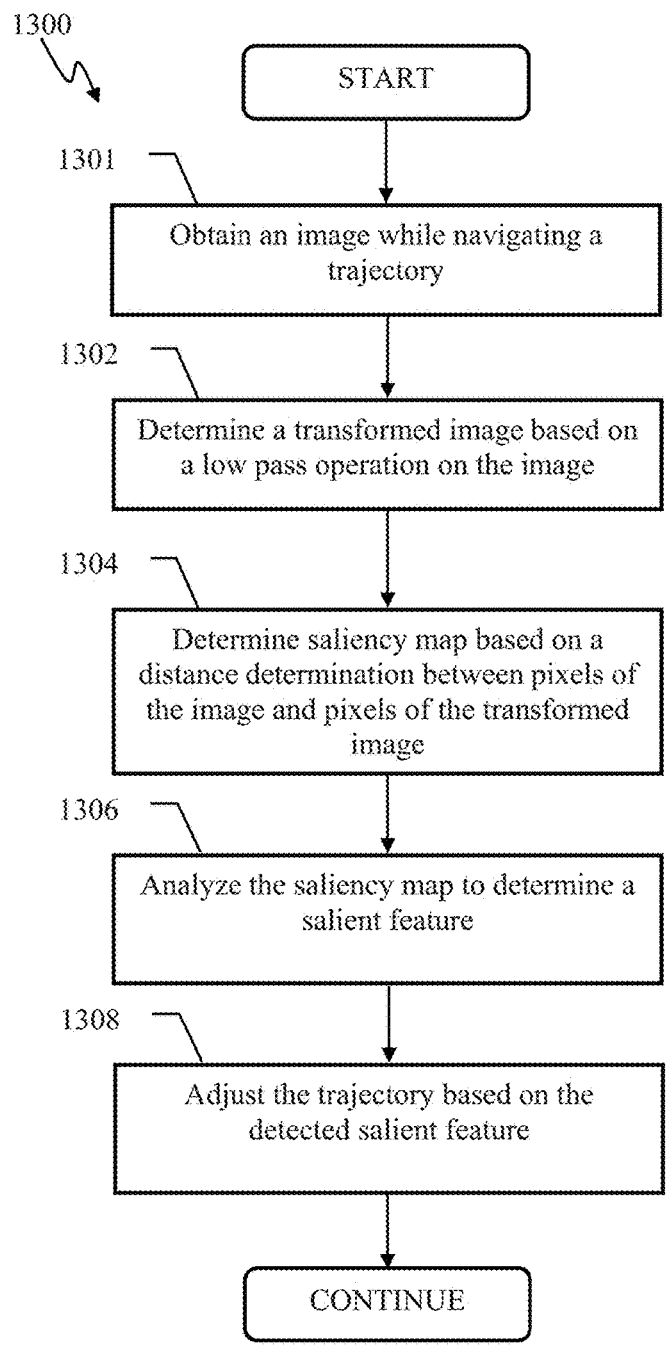
FIG. 13 is a logical flow diagram illustrating a method of trajectory navigation by a robotic device using salient feature detection, in accordance with one or more implementations.

In FIG. 13, a logical flow diagram of one embodiment of a method 1300 of trajectory navigation by a robotic device using salient feature detection in accordance with one or more implementations is shown. Autonomous navigation by a robotic apparatus may give rise to a need for detection of certain objects, e.g., obstacles and obstructions, or desired paths. In step 1301, an image is obtained while navigating a trajectory. In step 1302, a low-pass operation is applied to the captured image to obtain a transformed image. In steps 1304 and 1306, a saliency map is determined based on a distance determination between pixels of the image and the pixels of the transformed image, and then the saliency map is analyzed to determine a salient feature of the image. Various implementations are possible by applying operations and parameters such as those described above. The salient feature may indicate e.g., an obstacle or an incorrect path, or it may indicate the desired path to follow. Based on the salient feature determined in step 1306, the robotic apparatus may adjust its trajectory in step 1308.

Implementations of the principles of the disclosure may be further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure. Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method of operating a robotic device, the method comprising:
   obtaining a plurality of input images of a visual scene during navigation of a trajectory by the robotic device;
   determining a map of a back projected color histogram based upon a plurality of bins, a respective bin of the plurality of bins grouping a range of values corresponding to a difference between a first pixel and a second pixel in a respective input image of the plurality of input images, the second pixel corresponding to an average value of a plurality of pixels of the respective input image, the respective input image corresponding to a surrounding region of the visual scene;
   determining a salient feature of a respective pixel of the respective input image based on evaluation of the map, the salient feature corresponding to a number of pixels representing the same exact value in remaining of the respective input image; and
   adjusting the trajectory of the robotic device in accordance with a parameter associated with the salient feature.

2. The method of claim 1, further comprising:
transforming the plurality of input images, the transforming includes applying a low-pass imaging filter to the plurality of input images.

3. The method of claim 2, wherein the transforming of the plurality of input images comprises applying a Gaussian kernel to the plurality of input images.

4. The method of claim 1, further comprising:
determining a shape characteristic of the determined salient feature.

5. The method of claim 4, wherein the determining of the shape characteristic comprises determining a circularity of the salient feature.

6. A controller configured for use with a robotic apparatus, the controller comprising:
a sensor processor configured to execute computer readable instructions to analyze a sensor input, the sensor input being analyzed based at least on:
initialization of a tracking process using color saliency, the tracking process comprising at least one of (i) generation of a heat map corresponding to the sensor input from the color saliency, (ii) determination of a peak value in the generated heat map based on a threshold, and (iii) application of a plurality of thresholds below the peak value to produce a threshold heat map;
identification of a salient feature using the threshold heat map, the salient feature corresponding to a number of pixels representing the same exact value in remaining of the respective input image; and
communication of tracking information to the controller, the controller configured to cause an adjustment of a trajectory of the robotic apparatus in accordance with a characteristic of the salient feature.

7. The apparatus of claim 6, wherein
the identification of the salient feature is based at least in part on the color saliency;
the tracking information is automatically provided to the tracking process; and
the salient feature is associated with an object and the trajectory adjustment is configured to reduce a spatial separation between the object and the robotic apparatus.

8. The apparatus of claim 7, further comprising:
a manipulator, wherein the tracking information to the controller is further configured to cause the manipulator to pick up the object.

9. The apparatus of claim 6, wherein the identification of the salient feature comprises evaluation of a transformed version of the sensor input comprising at least one of: (i) a back projected image based on a histogram, and/or (ii) a low-passed image.

10. A non-transitory computer-readable apparatus having a plurality of computer readable instructions stored thereon, that when executed by at least one processor, configure the at least one processor to:
obtain a plurality of images during navigation of a robotic device along a trajectory;
transform the plurality of images via a low-pass operation;
determine a map based upon a difference between (i) a first pixel of a respective image of the plurality of images, and (ii) a second pixel, the second pixel corresponding to an average value of a plurality of pixels of a corresponding image of the transformed plurality of images;
determine change in position of a salient feature of an object from the map between one or more subsequent pairs of the plurality of images, the salient feature corresponding to a number of pixels representing the same exact value in remaining of the corresponding image;
determine a salient object based on an evaluation of the map; and
adjust the trajectory of the robotic device in accordance with the determined salient object.

11. The non-transitory computer-readable apparatus of claim 10, wherein the at least one processor is further configured to execute the computer readable instructions to cause the robotic device to determine a shape characteristic of the determined salient feature.

12. The non-transitory computer-readable apparatus of claim 11, wherein the shape characteristic is characterized by a circularity of the salient feature.

13. The non-transitory computer-readable apparatus of claim 10, wherein the determined salient feature comprises a gesture or a presence of a user.

14. The non-transitory computer-readable apparatus of claim 10, wherein:
the robotic device comprises two or more cameras; and
the two or more cameras are configured to obtain the plurality of images during the navigation of the trajectory.

15. The non-transitory computer-readable apparatus of claim 14, wherein the at least one processor is further configured to execute the computer readable instructions to,
cause the robotic device to determine a distance between the robotic device, and
determined salient feature, the determination of the distance comprising an interleaving of images from the two or more cameras.

16. The non-transitory computer-readable apparatus of claim 15, wherein the at least one processor is further configured to execute the computer readable instructions to,
cause a robotic device to determine a distance between the determined salient feature and a second salient feature, the second salient feature being determined based on an evaluation of a saliency map.

17. A method of operating a robotic platform, the method comprising:
receiving a sensory input including a plurality of images, a respective image including a plurality of colors;
determining a color saliency of the sensory input based on discriminability of a respective color of the plurality of colors in the sensory input from a reference color prototype;
initializing a tracking process using the determined color saliency to produce a heat map, the heat map comprising one or more potential salient features;
identifying a salient feature using shape information associated with the one or more potential salient features in the heat map, the shape information being correlated to each of the one or more potential salient features and a respective auxiliary shape associated with each of the one or more potential salient features, the salient feature corresponding to a number of pixels representing the same exact value in remaining of the respective image; and
adjusting trajectory of the robotic platform in accordance with a characteristic of the salient feature upon the tracking information being communicated to the controller.

18. The method of claim 17, further comprising:
- determining a saliency map, the saliency map comprising the color saliency; and
- identifying the salient feature within the saliency map.

19. The method of claim 18, wherein the identifying of the salient feature comprises:
- applying a filtering operation to the saliency map;
- determining the color saliency of an object comprising the salient feature; and
- implementing a variable threshold for detecting saliency.

20. The method of claim 17, wherein the causing of the adjustment of the trajectory of the robotic platform comprises:
- reducing a spatial separation between the robotic platform and an object comprising the salient feature; and
- picking up the object.

* * * * *